(12) United States Patent
Neubacher et al.

(10) Patent No.: US 11,859,909 B2
(45) Date of Patent: Jan. 2, 2024

(54) DEVICE FOR PRODUCING EXPANDED GRANULATED MATERIAL

(71) Applicant: Binder + Co AG, Gleisdorf (AT)

(72) Inventors: Julian Neubacher, Graz (AT); Harald Tschernko, Gleisdorf (AT)

(73) Assignee: Omya International AG, Oftringen (CH)

( * ) Notice: Subject to any disclaimer, the term of this patent is extended or adjusted under 35 U.S.C. 154(b) by 0 days.

(21) Appl. No.: 18/022,438

(22) PCT Filed: May 10, 2022

(86) PCT No.: PCT/EP2022/062553
§ 371 (c)(1),
(2) Date: Feb. 21, 2023

(87) PCT Pub. No.: WO2022/238362
PCT Pub. Date: Nov. 17, 2022

(65) Prior Publication Data
US 2023/0296323 A1    Sep. 21, 2023

(30) Foreign Application Priority Data

May 11, 2021  (EP) .................................... 21173308

(51) Int. Cl.
*F27D 25/00* (2010.01)
*F27B 1/10* (2006.01)

(52) U.S. Cl.
CPC .............. *F27D 25/001* (2013.01); *F27B 1/10* (2013.01)

(58) Field of Classification Search
CPC ........ F27D 25/001; F27B 1/10; C04B 20/068; C04B 20/06

(Continued)

(56) References Cited

U.S. PATENT DOCUMENTS 2,521,190 A * 9/1950 Stafford .................. C03B 19/08
432/13
2,550,877 A   5/1951 Stafford et al.
(Continued)

FOREIGN PATENT DOCUMENTS

CA    3153978 A1    4/2021
EP   2 876 398 A1    5/2015
(Continued)

OTHER PUBLICATIONS

International Search Report in PCT/EP2022/062553, dated Oct. 14, 2022.
(Continued)

*Primary Examiner* — Scott R Kastler
*Assistant Examiner* — Michael Aboagye
(74) *Attorney, Agent, or Firm* — Collard & Roe, P.C.

(57) ABSTRACT

A device for producing expanded granulated material from grains of sand with an expanding agent includes a furnace with a furnace shaft, which has upper and lower ends. A conveying section extends between the ends and passes through separately-arranged heating zones in a conveying direction. At least one feeder charges at least the unexpanded material to the furnace shaft at one end toward the other end. At least one rotatable shaft insert is arranged at least in sections in the furnace shaft and has at least one scraper blade forming with an inner wall of the furnace shaft at least one gap having a gap width and being designed, during rotation of the at least one shaft insert in an operating state of the device, to remove caking on the inner wall at least in sections if a thickness of the caking is greater than the respective gap width.

23 Claims, 3 Drawing Sheets

(58) Field of Classification Search
USPC .................................................... 110/165 R
See application file for complete search history.

(56) References Cited

U.S. PATENT DOCUMENTS

| | | | |
|---|---|---|---|
| 2,625,512 A | | 1/1953 | Powell |
| 2,676,892 A | * | 4/1954 | McLaughlin ........... B28B 1/004 |
| | | | 432/13 |
| 4,512,736 A | * | 4/1985 | Wader .................... F27B 15/00 |
| | | | 432/13 |
| 4,602,962 A | * | 7/1986 | Fehlmann ........... C03B 19/1085 |
| | | | 501/84 |
| 5,108,461 A | * | 4/1992 | Ruthner ................ C04B 35/626 |
| | | | 432/13 |
| 9,809,495 B2 | | 11/2017 | Brunnmair |
| 10,174,998 B2 | | 1/2019 | Brunnmair |
| 10,611,686 B2 | * | 4/2020 | Brunnmair ................ F27B 1/20 |
| 2013/0126330 A1 | | 5/2013 | Zhu et al. |
| 2018/0141862 A1 | | 5/2018 | Brunnmair et al. |
| 2020/0071229 A1 | | 3/2020 | Brunnmair et al. |

FOREIGN PATENT DOCUMENTS

| | | |
|---|---|---|
| RU | 2551330 C2 | 5/2015 |
| RU | 2709570 C2 | 12/2019 |
| SU | 140363 | 11/1961 |
| WO | 2013/053635 A1 | 4/2013 |
| WO | 2016/191788 A1 | 12/2016 |
| WO | 2018/191763 A1 | 10/2018 |

OTHER PUBLICATIONS ritten Opinion of the International Searching Authority (WO/ISA) in PCT/EP2022/062553 dated Oct. 14, 2022, with English translation of relevant parts.

* cited by examiner

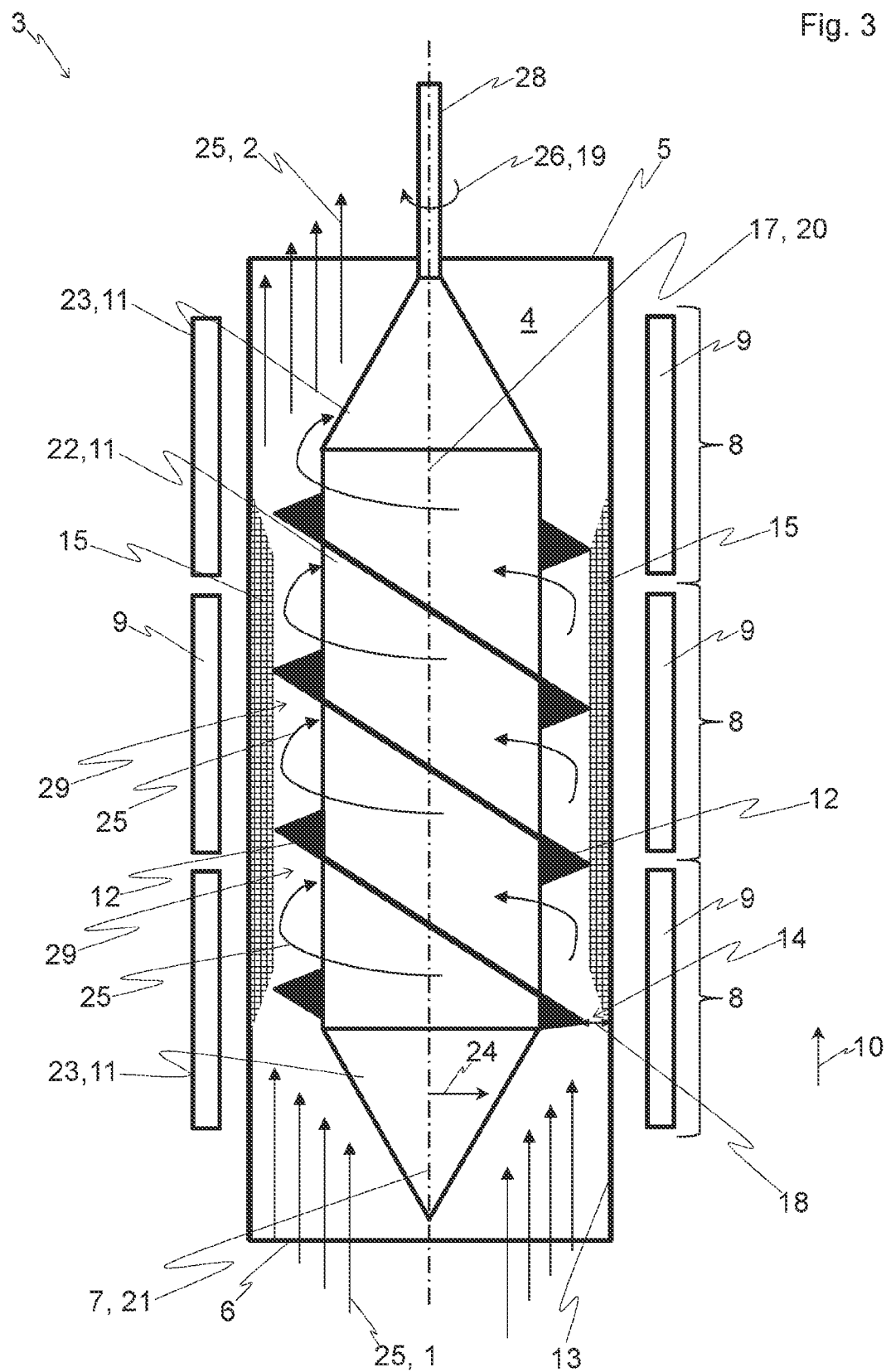

DEVICE FOR PRODUCING EXPANDED GRANULATED MATERIAL

CROSS REFERENCE TO RELATED APPLICATIONS

This application is the National Stage of PCT/EP2022/062553 filed on May 10, 2022, which claims priority under 35 U.S.C. § 119 of European Application No. 21173308.4 filed on May 11, 2021, the disclosure of which is incorporated by reference. The international application under PCT article 21(2) was not published in English.

FIELD OF THE INVENTION

The present invention relates to a device for producing an expanded granulated material from mineral material in the form of grains of sand with an expanding agent, for example for producing an expanded granulated material from perlite or obsidian sand with bound water as expanding agent, the device comprising a furnace with a substantially vertically standing furnace shaft having an upper end and a lower end, wherein a conveying section extends between the two ends, wherein further at least one feeding means is provided which is adapted to charge at least the unexpanded material at one of the two ends of the furnace shaft into the furnace shaft in the direction of the other of the two ends of the furnace shaft in order to expand the material, as seen in a conveying direction, in the last half, preferably in the last third, of the conveying section, wherein at least one rotatable shaft insert is provided, which is arranged at least in sections in the furnace shaft and has at least one scraper blade, which forms with an inner wall of the furnace shaft at least one gap having a gap width and which is designed, during rotation of the at least one shaft insert in an operating state of the device, to remove caking on the inner wall in sections if a thickness of the caking is greater than the respective gap width, wherein the at least one shaft insert is rotatable about at least one axis of rotation which extends parallel to a longitudinal axis of the furnace shaft, preferably the at least one axis of rotation coinciding with the longitudinal axis.

DESCRIPTION OF THE PRIOR ART

From WO 2013/053635 A1 a method and a device for the, in particular closed-cell, expansion of sand-grain-shaped mineral material containing an expanding agent—such as bound water—are known. In this process, the material is fed from above into a furnace with a substantially vertical furnace shaft. By means of gravity, the material is conveyed through the furnace shaft from its upper end to its lower end along a conveying section in a conveying direction. The conveying section passes through several heating zones arranged separately from each other in the conveying direction and equipped with independently controllable heating elements in order to heat the material to a critical temperature and to expand the sand grains. The expansion process is isenthalpic and is accompanied by a corresponding drop in temperature, which can be detected. The expanded granulated material is discharged at the bottom end. Due to buoyancy forces occurring in the furnace shaft, which are triggered, among other things, by the chimney effect of the furnace shaft and have different effects due to the different density before and after expansion, this type of expanding is suitable for raw sands with grain sizes typically greater than or equal to 75 µm, in particular greater than or equal to 100 µm. For finer grains, the buoyancy forces become too large for a reliable expanding result. In addition, with fine grain sizes there is an increased risk of agglomeration or "caking" on the inner wall of the furnace shaft, because particles that are too light or have too low a density remain suspended in the heating zone for too long. In this case, the particles continue to absorb energy after expansion and soften again, without isenthalpic shape change leading to cooling, which in turn significantly increases the risk of agglomeration or caking on the inner wall of the furnace shaft. This danger increases as the grain band becomes narrower, since—figuratively speaking—there are no longer enough coarser and thus at the same time heavier particles to pull the finer particles along against the buoyancy forces.

In order to expand raw sands with finer grain sizes, it is known from WO 2016/191788 A1 as well as WO 2018/191763 A1 to feed or inject the material together with a quantity of air from the bottom to the top of the furnace shaft and to convey it through the furnace shaft. It has been recognized that when feeding very fine grains in combination with blowing in, different flows have to be synchronized in order to subsequently obtain a uniform flow profile through the furnace shaft and to avoid turbulence, as this favors agglomerations/caking on the shaft wall. Such agglomerations/caking, in turn, cause successive "overgrowth" of the shaft and, consequently, obstruction of the heat radiation, which in turn leads to poorer expansion results.

In addition, it should be noted that, usually, caking cannot be completely avoided even when expanding sands of coarser grain sizes and may have a negative influence on the expansion result.

U.S. Pat. Nos. 2,625,512 A, 2,521,190 A and 2,550,877 A each describe a furnace having a vertical furnace shaft for expanding perlite sand. Perlite sand is fed into the furnace shaft from above and heated for expansion at the top of the furnace shaft by means of an annular gas burner. A water-cooled tube is placed in the furnace shaft and is rotated around the vertical axis of the furnace shaft to scrape caked expanded perlite sand from the inner wall of the furnace shaft.

OBJECT OF THE INVENTION

It is therefore the object of the present invention to provide a device for the production of an expanded granulated material which overcomes the above-mentioned disadvantages associated with caking. In particular, a uniform, constant expansion is to be made possible, preferably for as wide a range of granulations as possible.

SUMMARY OF THE INVENTION

The core of the invention is the consideration that caking ("agglomeration") of the sand-grain-shaped mineral material at or on the inner wall of the furnace shaft is unavoidable and must therefore be included in order to achieve a defined expansion process. For this purpose, in a device for producing an expanded granulated material from sand-grain-shaped mineral material with an expanding agent, for example for producing an expanded granulated material from perlite or obsidian sand with bound water as expanding agent, the device comprising a furnace having a substantially vertically standing furnace shaft, which has an upper end and a lower end, wherein a conveying section extends between the two ends, wherein furthermore at least one feeding means is provided, which is adapted to feed at least the unexpanded material at one of the two ends of the furnace shaft into the furnace shaft in the direction of the other of the two ends of the furnace shaft in order to expand the material, as seen in a conveying direction, in the last half, preferably in the last third, of the conveying section, wherein at least one rotatable shaft insert is provided, which is arranged at least in sections in the furnace shaft and has at least one scraper blade which forms at least one gap having a gap width with an inner wall of the furnace shaft and is adapted, during rotation of the at least one shaft insert in an operating state of the device, to remove caking on the inner wall in sections if a thickness of the caking is greater than the respective gap width, wherein the at least one shaft insert is rotatable about at least one axis of rotation which extends parallel to a longitudinal axis of the furnace shaft, wherein the at least one axis of rotation preferably coincides with the longitudinal axis, it is provided in accordance with the invention that the conveying section leads through a plurality of heating zones which are arranged separately from one another in a conveying direction, wherein the heating zones each comprise at least one heating element which can be controlled independently of one another in order to heat the material at least to a critical temperature and to expand the sand grains, and that the at least one shaft insert each comprises a base body from which the at least one scraper blade projects with a directional portion parallel to a radial direction, wherein the radial direction lies in a plane normal to the axis of rotation of the respective shaft insert and, starting from the respective axis of rotation, faces away therefrom, wherein the respective base body, as viewed at least in the radial direction, is substantially closed.

The conveying direction is substantially parallel to the vertical or the plumb direction and may be from top to bottom or, conversely, from bottom to top. This means that the at least one shaft insert may be provided both when feeding the material from above and when feeding the material from below. In the case of feeding from above, the material to be expanded is at least partially conveyed along the conveying section by means of gravity, thereby forming a particle flow in the furnace shaft. A chute, for example, can be provided here as a feeding means for the material to be expanded. In the case of feeding from below, the material to be expanded is typically fed into the furnace shaft together with a quantity of air and conveyed through the furnace shaft. The feeding means here can be, for example, a suction nozzle cooperating with a fan, which is connected upstream of the furnace shaft and is adapted to suck the unexpanded material into the furnace shaft together with a quantity of air at the lower end of the furnace shaft in the direction of the upper end. The air volume forms an air flow flowing from bottom to top, by means of which the material in the form of grains of sand is conveyed in the form of a particle flow through the furnace shaft from bottom to top along the conveying section in order to be expanded in the upper half, preferably in the uppermost third, of the conveying section.

The heating elements can be used to define the heating zones, since different heating zones must each have at least one heating element, and these heating elements must be independently controllable.

For the sake of completeness, it is noted that, as viewed in the conveying direction, the last half is the second half, or the last third is the third third. According to the invention, the caking is no longer regarded as process-disturbing, but their thickness is controlled by means of the at least one shaft insert in order to have a homogenising effect on the expansion result. The shaft insert with its at least one scraper blade forms a gap between the scraper blade and the inner wall of the furnace shaft. Typically, the gap width is in the range of 2 mm to 5 mm.

In the operating condition of the device, when material is conveyed through and expanded in the furnace shaft, the gap is covered with caked material within a short period of time. This caking is then continuously removed by means of the at least one scraper blade as the at least one shaft insert rotates, wherein "removal" includes shearing, stripping, cutting off, pushing off or scraping off.

The thickness of the caking is limited by the removal and remains approximately constant, more precisely in a certain range around the gap width. This approximately constant and approximately uniform thickness of the caking guarantees an approximately constant radiation intensity, which can be introduced into the furnace shaft—through the caking—by means of the heating elements. The resulting approximately, or substantially, constant energy input into the furnace shaft in turn provides uniform expansion and ensures a substantially constant expansion result substantially throughout the operation of the device.

The fact that the removal takes place "at least in sections" is to be understood in such a way that, on the one hand, in a certain plane normal to a longitudinal axis of the furnace shaft, the removal does not have to take place simultaneously around the entire angular range of 360° around the longitudinal axis. On the other hand, the term "in sections" is also used in practice, if only because the gap with a gap width greater than zero does not remove the entire thickness (locally) of the caking, but a certain thickness of the caking is deliberately retained. This means that both the gap or gap width and the thickness are to be understood as greater than zero.

In practice, due to manufacturing tolerances, the gap width is to be understood as lying within a certain gap width range or may vary slightly.

Accordingly, in practice the thickness of the caking is also to be regarded as lying within a thickness range. Furthermore, the actual thickness of the caking at a certain point in time at a certain location in the furnace shaft is the result of a dynamic process, which means that the thickness is not constant everywhere and at all times, but varies within a certain range in terms of time and location, since new caking is constantly being added on the one hand and removed on the other. Accordingly, areas where the thickness is greater than the gap width can arise —temporarily, until the removal takes place by means of the at least one scraper blade.

The fact that the sand grains in the furnace shaft move as a particle flow along the conveying section largely in well-defined movement ranges between the scraper blade or blades, the rest of the shaft insert and the caking also contributes to uniform expansion or to the constant and defined expansion result. Accordingly, the residence time of the sand grains in the furnace shaft—and thus the expansion process or the expansion result—can be quite precisely defined or controlled.

The inner wall per se is to be understood without the caking, which is to be kept within a certain range with respect to its thickness. For example, a limiting element, in particular in the form of a so-called steel liner, can be provided to form the inner wall. In this context, it would also be theoretically possible for the inner wall not to be formed by the delimiting element or the steel liner, but by one or more layers on the delimiting element or steel liner, which layers, however, are not the caking to be controlled in its thickness. Accordingly, the gap is to be understood with its gap width, i.e. in relation to the concrete inner wall without caking.

The gap width and thickness of the caking can be measured parallel to a radial direction normal to a longitudinal axis of the furnace shaft and facing outward from a radial center of the furnace shaft, which typically coincides with the longitudinal axis. Typically, this radial direction is normal to the inner wall.

The at least one shaft insert can be designed as removable so that it is easy to change between different shaft inserts. The different shaft inserts can differ from each other, e.g. by different scraper blades, in particular with regard to their number and/or course and/or resulting gap widths and/or resulting movement ranges for the sand grains.

The at least one shaft insert is made of one or more materials that can withstand the temperatures that occur in the furnace shaft. Said materials may include, for example, metals, in particular stainless steels or nickel-based alloys, or carbon fiber or ceramics, in particular high-performance ceramics.

It should be noted that the at least one shaft insert does not have to be arranged completely in the furnace shaft, but can also protrude in sections from the furnace shaft—at the upper and/or lower end. The respective section protruding from the furnace shaft can prove advantageous for the bearing and/or for the drive of the respective shaft insert.

However, it is also conceivable that the at least one shaft insert is arranged completely in the furnace shaft—and only stored within it.

The at least one shaft insert also does not have to extend over the entire furnace shaft or over its entire length or over the entire conveying section.

In principle, a single shaft insert can be provided. This can be constructed from several parts or segments. Typically, in this case the shaft insert can be rotated about an axis of rotation that coincides with the longitudinal axis of the furnace shaft. The latter can also be the case if several shaft inserts are provided which, as viewed in the conveying direction, are arranged one behind the other. In this case it would be conceivable, for example, that the different shaft inserts rotate at different speeds and/or form different gap widths. In these cases, rotation of the respective shaft insert in a furnace shaft with a substantially circular cross-section (normal to the longitudinal axis of the furnace shaft) effectively results in an annular gap between the respective at least one scraper blade and the inner wall of the furnace shaft in each case. Accordingly, in the device according to the invention, it is provided that the at least one shaft insert is rotatable about at least one axis of rotation which is parallel to a longitudinal axis of the furnace shaft, preferably the at least one axis of rotation coinciding with the longitudinal axis.

Theoretically, however, several different axes of rotation are also possible in the case of several shaft inserts, even if these are arranged one behind the other, at least in sections, as seen in the conveying direction.

In particular, it would also be conceivable for several shaft inserts to be provided which, as viewed in the conveying direction or in a sectional plane normal to the longitudinal axis, are arranged next to one another and have different axes of rotation, wherein axes of rotation can extend parallel to the longitudinal axis of the furnace shaft in each case.

Analogous to the above, it is provided in a preferred embodiment of the device according to the invention that the at least one shaft insert is rotatably mounted in the region of the upper end of the furnace shaft, wherein preferably the at least one shaft insert is floatingly mounted in the region of the lower end of the furnace shaft.

The region of the upper end of the furnace shaft in which the at least one shaft insert is rotatably mounted can be arranged outside the furnace shaft. In addition to a structurally simple and particularly stable mechanical bearing, this also enables a structurally simple (rotary) drive of the shaft insert.

In the operating state of the device, the floating bearing arrangement ensures a particularly stable or constant and defined gap over its entire length parallel to the conveying section at different rotational speeds of the at least one shaft insert. This makes it possible to achieve a particularly precisely defined thickness of the caking and thus a particularly high uniformity of the process, which in turn has a positive effect on the expansion result.

The region of the lower end of the furnace shaft in which the at least one shaft insert is floatingly mounted may be arranged outside the furnace shaft.

For example, a centering pin can be provided on the shaft insert for floating bearing, which is ("floatingly") mounted so that it can move along the axis of rotation. The centering pin extends along the axis of rotation and is dimensioned, in particular in its length measured along the axis of rotation, in such a way that "floating" or movable bearing is ensured for all thermal expansions of the shaft insert.

In a preferred embodiment of the device according to the invention, it is provided that the at least one shaft insert has several, preferably at most eight, particularly preferably two to four, scraper blades. This means that the indicated number can be regarded as the total number and/or as the number of scraper blades per shaft insert (if several shaft inserts should be provided). Multiple scraper blades are advantageous in terms of the accuracy with which the expansion process can be adjusted. For example, multiple scraper blades can be used to create different gaps along the conveying section in order to influence the expansion process.

The number of scraper blades of the respective shaft insert can also be designed variably, for example in that the scraper blades can be retracted/extended or inserted/removed.

In particular, if several scraper blades are arranged one behind the other as viewed in a circumferential direction around the longitudinal axis or around the radial center of the furnace shaft, a particularly uniform thickness of the caking can be achieved in the entire angular range around the radial center, which in turn leads to a particularly uniform expansion or expansion result. Accordingly, in a particularly preferred embodiment of the device according to the invention, it is provided that at least two of the scraper blades are arranged one behind the other as viewed in a circumferential direction around a radial center of the furnace shaft. It is understood that more than two of the scraper blades, in particular all of the scraper blades, can also be arranged one behind the other as viewed in the circumferential direction.

In accordance with the above-mentioned increased design possibility by means of several scraper blades, it is provided in a particularly preferred embodiment of the device according to the invention that at least two of the scraper blades form gaps with different gap widths with the inner wall. In this case, the gap width can vary as seen in the conveying direction, i.e. the gaps with different gap widths can be arranged one behind the other at least in sections as seen in the conveying direction. This can, for example, influence the residence time of the sand grains in zones of different temperature.

Alternatively or additionally, the gap width can vary when viewed in the circumferential direction, i.e. the gaps with different gap widths can be arranged one behind the other, at least in sections, when viewed in the circumferential direction. In this way, for example, the process of removing the caking can be optimized in order to set a desired thickness very precisely.

Depending on the temperature and the material to be expanded, the thickness of the caking can grow at different rates. Accordingly, it may be necessary to accelerate or, optionally, slow down the (sectional) removal of the caking. The latter, in particular, may also prove advantageous for setting desired particle flows in the furnace shaft. Therefore, in a preferred embodiment of the device according to the invention, it is provided that at least one drive means is provided for rotating the at least one shaft insert at a variable rotational speed, wherein the rotational speed is preferably in the range of 0.125 rpm ("revolutions per minute") to 3 rpm, more preferably in the range of 0.5 rpm to 2 rpm. For example, in practice, the rotational speed can be set or varied in the range around 1 rpm.

Suitable drive means, which can be connected to the at least one shaft insert, for example via at least one drive shaft, are known per se. For example, electric motors are suitable as drive means, wherein gears or variable ratios or reductions can be provided for varying the rotational speed. It would also be conceivable to use one or more electric motors whose rotational speed is varied by means of frequency converter(s) in order to vary the rotational speed of the at least one shaft insert.

In the device according to the invention, it is provided that the at least one shaft insert has in each case a base body from which the at least one scraper blade projects with a directional portion parallel to a radial direction, wherein the radial direction lies in a plane normal to an axis of rotation of the respective shaft insert and, starting from the respective axis of rotation, faces away from the latter, wherein the respective base body is substantially closed as seen at least in the radial direction. According to this definition of the radial direction, there is an infinite number of radial directions in said plane normal to the axis of rotation of the respective shaft insert.

It is not excluded that other directional components are not equal to zero, so that the at least one scraper blade protrudes "crookedly" from the respective base body. Preferably, however, the other directional components are zero.

The term "substantially closed" means a closedness apart from any openings that may be present to a minor extent, which may be more or less unavoidably present, e.g. due to manufacturing steps, but are negligible. The closedness of the base body, especially in the radial direction, guarantees that the sand grains cannot get out of their areas of movement into the base body. Accordingly, the sand grains can be guided in the movement ranges at a defined distance from the inner wall or the caking in order to guarantee a defined energy input.

In a particularly preferred embodiment of the device according to the invention, it is provided that the respective base body is essentially in the shape of a rotating cylinder, wherein preferably as seen in the conveying direction upstream and/or downstream of the respective base body a shaft insert section tapering along the axis of rotation and away from the base body adjoins, in particular flush with, the respective base body. In principle, however, other shapes of the base body are also conceivable, in which case it is preferably the shape of a rotary body, for example a conical shape or the shape of a truncated cone.

The taper of the shaft insert section(s) is away from the respective base body, which proves to be very favorable in terms of flow. This means that the particle flow or the sand grains are continuously guided by the conical shape of the respective shaft insert section in the direction of the base body and thus into the movement ranges, and are continuously guided away from the base body again from the movement ranges.

In principle, a wide variety of concrete shapes for the shaft insert sections are conceivable. Preferably, the shaft insert sections are conical or frustoconical.

The shaft insert section(s) and the base body represent different segments of the shaft insert ("shaft insert segments").

The tapered shaft insert section(s) is/are preferably also essentially closed, at least as viewed in the radial direction. This ensures that no sand or granulated material enters the shaft insert in the area of the respective shaft insert section, but can move exclusively between the shaft insert and the caking (optionally inner wall) through the furnace shaft with a directional portion parallel to the conveying direction. In principle, it can be provided that the shaft insert is essentially closed—without restriction to the radial direction—so that sand particles cannot enter the shaft insert. Preferably, the shaft insert is designed as a hollow body with an interior space in order to save material and weight. Small pressure relief openings can be provided on the shaft insert, in particular on the base body and/or on the shaft insert section(s) that may be present, in order to allow air or gas that is located in the interior of the shaft insert and expands (or contracts) due to temperature to pass out of (or into) the interior of the shaft insert and thus bring about pressure equalization.

In order to improve the adjustability of the expansion process, it is provided in a particularly preferred embodiment of the device according to the invention that the at least one scraper blade is extendable/retractable and/or pivotable on the respective base body in order to be able to adjust the gap width. The extension to reduce the gap width or the retraction to increase the gap width can take place with a directional component in or against the radial direction.

The pivoting takes place in each case about a pivot axis which is preferably parallel to the longitudinal axis or the respective axis of rotation. Other arrangements of the respective pivot axis, in which the gap width changes due to the pivoting movement of the respective scraper blade, are of course also conceivable.

In order to make the design of the at least one scraper blade particularly simple, it is provided in a preferred embodiment of the device according to the invention that the at least one scraper blade extends essentially in a straight line, preferably parallel to the conveying direction.

In particular, the respective scraper blade can extend parallel to the longitudinal axis of the furnace shaft or to the axis of rotation of the respective shaft insert.

In order to make the path that the sand or granulated material has to take through the movement ranges particularly long and thus to be able to carry out the thermal treatment of the grains in the furnace shaft for a particularly long time, it is provided in a preferred embodiment of the device according to the invention that the at least one scraper blade extends at least in sections in a spiral or helical shape around an axis of rotation of the respective shaft insert. The individual scraper blade does not have to extend completely around the axis of rotation, but can also merely cover a substantially smaller angular range than 360°.

In accordance with the above, in the case of several shaft inserts, the spiral scraper blades can theoretically also extend spirally around different axes of rotation, at least in sections.

It should be noted that in the case of several scraper blades, both straight-line and spirally extending scraper blades—i.e. also several straight-line and/or several spirally extending scraper blades—can be provided. The areas of movement for the sand or granulated material can be designed in a correspondingly wide variety of ways.

It should be noted that, analogously to what has been said above, the gap width can be made to vary when viewed in the circumferential direction by appropriate design of the at least one spirally extending scraper blade—i.e., in a particularly preferred embodiment of the device according to the invention, it is provided that the gap width varies when viewed in a circumferential direction around a radial center of the furnace shaft. In this case, the variation of the gap width of the gap formed by the spirally extending scraper blade and the inner wall is also given when viewed in the conveying direction due to the spiral or helical shape. As mentioned, the radial center typically coincides with the longitudinal axis of the furnace shaft. This means that the gap width can vary when viewed in the circumferential direction—but also when viewed in the conveying direction—even if only a single spirally extending scraper blade is provided.

In accordance with the above, in a preferred embodiment of the device according to the invention, it is provided that, as viewed in the conveying direction, the gap width of the at least one gap varies. This can be realized both with scraper blades extending in a straight line and with scraper blades extending spirally at least in sections.

In particular, this allows different stages of expansion to be taken into account and the residence time in different sections of the furnace shaft along the conveying direction to be influenced. For example, a continuous increase or decrease in the gap width can be achieved as seen in the conveying direction.

In a preferred embodiment of the device according to the invention, it is provided that the inner wall is formed by at least one limiting element, which is preferably made of high-temperature steel, and that the at least one shaft insert is made of the same material as the at least one limiting element. Said choice of material ensures the fulfillment of the same performance requirements for the limiting element as for the shaft insert. Furthermore, the same choice of material also results in the same coefficients of thermal expansion, whereby distortion due to different thermal expansion can be avoided and a constant gap shape or gap size can be ensured.

Preferably, the furnace is constructed of one or more other materials, in particular thermally insulating materials, when viewed in the radial direction behind the limiting element.

High-temperature steel is a well-known type of stainless steel.

On the one hand, the limiting element makes it possible to ensure in a structurally simple manner that the material fed into the furnace shaft cannot come into contact with heating elements which, as viewed in the radial direction, are arranged behind the limiting element. On the other hand, by means of the at least one limiting element, a desired, in particular circular, cross-sectional shape of the furnace shaft can be very easily realized as precisely as possible and, if necessary, adapted for different applications.

The correct or suitable choice of material for the limiting element allows it to be used in all temperature ranges that play a role in practice without the functionality of the limiting element being impaired or even damaged. When expanding perlite or obsidian, metallic materials in particular come into consideration. In this context, it would also be conceivable—especially for other minerals requiring a higher calcining temperature—to manufacture the limiting element not from metal but from another suitable material, e.g. carbon fiber or (high-performance) ceramics.

As already mentioned, the shaft insert can consist of several parts or segments. These can be assembled and disassembled, particularly during installation and removal of the shaft insert, which simplifies the respective process. This applies in particular to the base body. Accordingly, in a particularly preferred embodiment of the device according to the invention, it is provided that the base body is constructed from a plurality of partial segments which are detachably connected to one another. This enables the base body to be assembled and disassembled without difficulty during installation and removal. The detachable connection of the partial segments can be realized in a manner known per se, for example by screwing.

BRIEF DESCRIPTION OF THE DRAWINGS

The invention will now be explained in more detail by means of exemplary embodiments. The drawings are exemplary and are intended to illustrate the idea of the invention, but in no way to restrict it or even to reproduce it conclusively, wherein:

FIG. 3 shows a schematic sectional view of a second embodiment of the device according to the invention, wherein the longitudinal axis of the furnace of the device is located in the sectional plane.

DETAILED DESCRIPTION OF THE PREFERRED EMBODIMENTS

Figure 1:
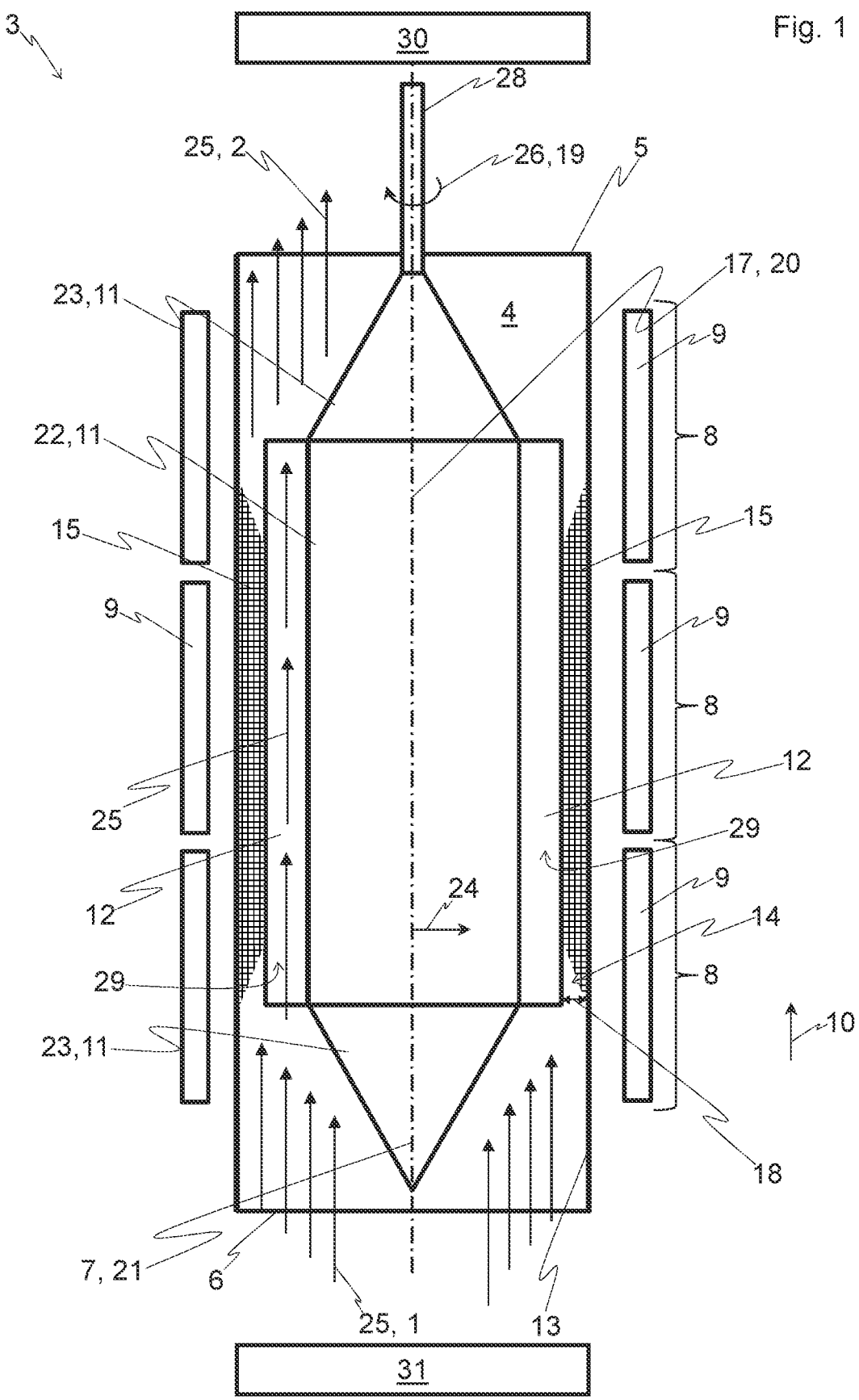
FIG. 1 shows a schematic sectional view of a first embodiment of the device according to the invention, wherein a longitudinal axis of a furnace of the device lies in the sectional plane.

FIG. 1 shows a first embodiment of a device according to the invention for producing an expanded granulated material 2 from mineral material in the form of grains of sand with an expanding agent. In the exemplary embodiments shown, the mineral material from which the expanded granulated material 2 is produced is perlite sand 1 containing bound water as an expanding agent.

The device comprises a furnace 3 having a substantially vertically disposed furnace shaft 4, which has an upper end 5 and a lower end 6, wherein between the two ends 5, 6 a conveying section 7 extends, which leads through several heating zones 8 arranged separately from one another in a conveying direction 10. The conveying direction 10 is substantially parallel to the direction of gravity and can in principle face in the direction of gravity or against the direction of gravity. In the exemplary embodiments shown, the conveying direction 10 faces against the direction of gravity, i.e. from the lower end 6 to the upper end 5.

The heating zones 8 each have at least one heating element 9 that can be controlled independently of one another in order to heat the perlite sand 1 to at least a critical temperature and to expand the perlite sand grains 1. In particular, the heating elements 9 may be electrical heating elements 9.

Furthermore, at least one feeding means is provided, which is adapted to feed at least the unexpanded perlite sand 1 at one of the two ends 5, 6 of the furnace shaft 4 in the direction of the other of the two ends 6, 5 of the furnace shaft 4 into the furnace shaft 4 in order to inflate the perlite sand 1, as seen in the conveying direction 10, in the last half, preferably in the last third, of the conveying section 7. In the exemplary embodiments shown, the feeding of the unexpanded perlite sand 1 takes place at the lower end 6 in the direction of the upper end 5, with the expanded granulated material 2 exiting at the upper end 5. A suction nozzle 31 cooperating with a fan Q can be provided, for example, as the feeding means for this, which nozzle 31 is connected upstream of the furnace shaft 4 and is set up to suck the unexpanded perlite sand 1 together with a quantity of air at the lower end 6 of the furnace shaft 4 in the direction of the upper end 5 into the furnace shaft 4. The quantity of air thereby forms an air flow flowing from bottom to top, by means of which the perlite sand 1 is conveyed as a particle flow 25 from bottom to top along the conveying section 7 in order to be expanded in the upper half, preferably in the uppermost third, of the conveying section 7.

In an operating state of the device, caking 15 or agglomeration of perlite sand 1, some of which may already be expanded, occurs on an inner wall 13 of the furnace shaft 4.

Figure 2:
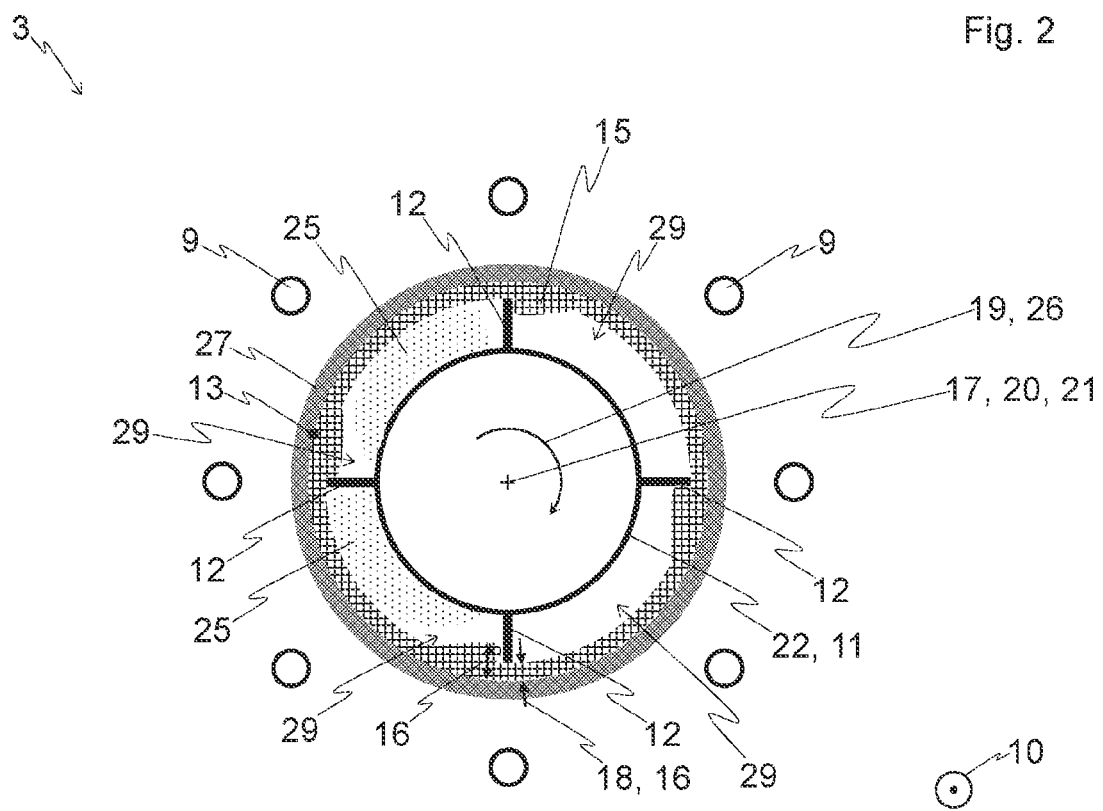
FIG. 2 shows a schematic sectional view of the device from FIG. 1 from above, wherein the sectional plane is normal to the longitudinal axis.

In the illustrated exemplary embodiments of the device according to the invention, a rotatable shaft insert 11 is provided in each case, which is arranged in the furnace shaft 4, wherein a drive shaft 28 of the shaft insert 11 projects from the upper end 5 of the furnace shaft 4. The shaft insert 11 has at least one scraper blade 12, which forms at least one gap 14 with the inner wall 13 of the furnace shaft 4, having a gap width 18, and is set up to remove the caking 15 arranged in the gap 14 on the inner wall 13 in sections when the shaft insert 11 is rotated in the operating state of the device, if a thickness 16 of the caking 15, cf. FIG. 2, is greater than the respective gap width 18.

The gap width 18 is typically in the range of 2 mm to 5 mm.

This means that in the operating state of the device, when the perlite sand 1 is conveyed through the furnace shaft 4 and expanded therein, the gap 14 is covered with caking 15 within a short time. This caking 15 is then continuously removed by means of the at least one scraper blade 12 as the shaft insert 11 rotates. As a result of the removal, the thickness 16 of the caking 15 is limited and remains approximately constant, more precisely in a certain range around the gap width 18. This approximately constant, approximately uniform thickness 16 of the caking 15 guarantees an approximately constant radiation intensity which can be introduced into the furnace shaft 4—through the caking 15—by means of the heating elements 9. The resulting approximately or substantially constant energy input into the furnace shaft 4 in turn provides for a uniform expansion and ensures (substantially throughout the operation of the device) a substantially constant expansion result. The fact that the perlite sand grains 1 in the furnace shaft 4 move as a particle flow 25 along the conveying section 7 largely in well-defined movement ranges 29 between the at least one scraper blade 12, the remaining shaft insert 11 and the caking 15 also contributes to the uniform expanding or constant and defined expansion result. Accordingly, the residence time of the perlite sand grains 1 in the furnace shaft 4—and thus the expansion process or the expansion result—can be determined or controlled quite precisely.

In the illustrated exemplary embodiments, the shaft insert 11 is rotatable in a direction of rotation 26— and, optionally, also against the direction of rotation 26—about an axis of rotation 20 that extends parallel to and coincides with a longitudinal axis 21 of the furnace shaft 4 and with a radial center 17 of the furnace shaft 4.

On the one hand, the drive shaft 28 serves to rotatably support the shaft insert 11 in the region of the upper end 5 of the furnace shaft 4. In the region of the lower end 6 of the furnace shaft 4, the shaft insert 11 is floatingly mounted, for example by means of a centering pin (not shown), which extends along the axis of rotation 20 and is movably supported parallel thereto.

On the other hand, drive means (not shown) may engage the drive shaft 28 to rotate the shaft insert 11. In the illustrated exemplary embodiments, the drive means are arranged to rotate the shaft insert 11 at a variable rotational speed, with the rotational speed preferably being in the range of 0.125 rpm to 3 rpm, particularly preferably in the range of 0.5 rpm to 2 rpm.

In the exemplary embodiments shown, the shaft insert 11 has a substantially rotationally cylindrical base body 22 from which the at least one scraper blade 12 projects with a directional portion parallel to a radial direction 24, wherein the radial direction 24 lies in a plane normal to the axis of rotation 20 of the shaft insert 11 and, starting from the axis of rotation 20, faces away therefrom. As viewed in the conveying direction 10, a respective tapering shaft insert section 23 is arranged upstream and downstream of the base body 22 and is flush with the base body 22. The taper is in each case along the axis of rotation 20 and faces away from the base body 22. The drive shaft 28 is connected to the rear shaft insert section 23 as seen in the conveying direction 10.

The base body 22 as well as the shaft insert sections 23 are substantially closed in shape, so that the perlite sand grains 1 cannot enter the shaft insert 11. Accordingly, the particle flow 25 can move practically exclusively in the movement ranges 29 along the conveying section 7, wherein the particle flow 25 is guided into and out of the movement ranges 29 in a flow-promoting manner by the tapering shape of the shaft insert sections 23. Preferably, the shaft insert 11 is hollow with an interior, wherein smaller pressure relief openings can be provided on the base body 22 and/or on the shaft insert sections 23 to allow air or gas, which is located in the interior of the shaft insert 11 and expands (or contracts) due to temperature, to pass out of (or into) the interior of the shaft insert 11 and thus effect pressure equalization.

In the exemplary embodiments shown, the shaft insert 11 is made of the same material as a limiting element 27 forming the inner wall 13, namely high-temperature steel. This ensures that the shaft insert 11, just like the inner wall 13, can easily withstand the temperatures that can occur in the operating state of the device in the furnace shaft 4 during expansion. Furthermore, the same choice of material also results in the same coefficients of thermal expansion, thus avoiding distortion due to different thermal expansion and ensuring a consistent shape or size of the gap 14. By forming the inner wall 13 by the limiting element 27, the geometry of the inner wall 13 or the (clear) cross-section of the furnace shaft 4 normal to the longitudinal axis 21 can be shaped in a well-defined manner, wherein said cross-section is substantially circular in the illustrated exemplary embodiments.

In the first exemplary embodiment shown in FIG. 1, four scraper blades 12 are provided which project uniformly from the base body 22 in a radial direction 24 and are arranged one behind the other as viewed in a circumferential direction 19 around the radial center 17, with an angular spacing between the scraper blades 12 being substantially constant. The scraper blades 12 thereby extend substantially rectilinearly and parallel to the conveying direction 10. Accordingly, there are four movement ranges 29 arranged symmetrically around the radial center 17 and extending rectilinearly parallel to the conveying direction 10.

The gap width 28 is correspondingly essentially constant as viewed in the conveying direction 10. The rotation of the shaft insert 11 creates an annular gap between the scraper blades 12 and the inner wall 13 bounding the circular clear cross-section of the furnace shaft 4, with the gap width 18 being essentially constant when viewed in the circumferential direction 19.

Accordingly, from a purely geometric point of view, without taking into account any turbulence that may occur in practice, perlite sand grains 1 in the particle flow 25 can move along straight lines parallel to the conveying direction 10 through the movement ranges 29. In FIG. 2, said symmetrical arrangement of the movement ranges 29 can be seen, wherein for reasons of clarity, the particle flow 25 is only indicated in two movement ranges 29.

The second exemplary embodiment, which is shown in FIG. 3, differs from the first exemplary embodiment only in the design of the scraper blades 12.

Unless explicitly stated otherwise, what has been said above about the first exemplary embodiment therefore also applies analogously to the second exemplary embodiment and will therefore not be repeated here.

As can be seen from FIG. 3, in the second exemplary embodiment, two scraper blades 12 are provided which project uniformly from the base body 22 in the radial direction 24 and each extend spirally about the axis of rotation 20 of the shaft insert 11. The two spiral or helical shapes of the scraper blades 12 are thereby nested within one another.

Accordingly, the resulting two movement ranges 29 also extend in a spiral or helical shape around the axis of rotation 20. Consequently, when the perlite sand grains 1 move through the movement ranges 29 in the particle flow 25, they must also follow the respective spiral or helical shape, which—from a purely geometrical point of view—results in a significantly longer path for the perlite sand grains 1 through the furnace shaft 4 compared to the first exemplary embodiment. The thermal treatment of the perlite sand grains 1 in the furnace shaft 4 can therefore be comparatively longer and thus even more precise in order to further optimize the expansion result.

It should also be noted that in the second exemplary embodiment shown, the gap width 28 is also essentially constant when viewed in the conveying direction 10. Likewise, the rotation of the shaft insert 11 creates an annular gap between the scraper blades 12 and the inner wall 13 delimiting the circular clear cross-section of the furnace shaft 4, with the gap width 18 being substantially constant when viewed in the circumferential direction 19.

Finally, it should be noted that in the second exemplary embodiment, the choice of the direction of rotation 26 offers a further possibility to influence the residence time of the perlite sand grains 1 in the furnace shaft 4 and thus the expansion result. If, in contrast to what is shown in FIG. 3, the direction of rotation 26 in interaction with the specific screw shape of the scraper blades 12 is such that the direction of movement of a corresponding screw along the axis of rotation 26 is opposite to the conveying direction 10, this can effectively reduce the path of the perlite sand grains 1 again. In fact, in purely theoretical terms, it would then be conceivable that with the "correct" rotational speed and the correct flow velocity, a linear movement of the perlite sand grains 1 in the particle flow 25 parallel to the conveying direction 10 could practically result. Conversely, in the second exemplary embodiment, the direction of rotation 26 shown in FIG. 3 leads to an extension of the residence time, since a spiral or helical particle flow 25 is forced.

A further aspect concerning the direction of rotation 26 is that, given the specific helical geometry of the scraper blades 12, this determines whether the caking 15 is primarily scraped off on a top side of the blade or on a bottom side of the blade, wherein in FIG. 3 the bottom side of the blade is in front of the top side of the blade 10 as viewed in the conveying direction 10. Preferably, as shown in FIG. 3, the direction of rotation 26 is selected in such a way that the underside of the blade assumes the stripping function, since the caking 15 then does not remain on the respective stripping blade 12 due to the force of gravity, but is transferred to the air flow and is discharged together with the expanded granulated material 2.

LIST OF REFERENCE SIGNS

1 Perlite sand
2 Expanded granulated material
3 Furnace
4 Furnace shaft
5 Upper end of the furnace shaft
6 Lower end of the furnace shaft
7 Conveying section
8 Heating zone
9 Heating element
10 Conveying direction
11 Shaft insert
12 Scraper blade
13 Inner wall of the furnace shaft
14 Gap
15 Caking
16 Caking thickness
17 Radial center of the furnace shaft
18 Gap width
19 Circumferential direction
20 Axis of rotation
21 Longitudinal axis of the furnace shaft
22 Base body
23 Tapering shaft insert section
24 Radial direction
25 Particle flow
26 Direction of rotation
27 Limiting element
28 Drive shaft
29 Movement range
30 Fan
31 Suction nozzle

The invention claimed is:

1. A device for producing an expanded granulated material from an unexpanded mineral material in the form of grains of sand with an expanding agent, the device comprising a furnace with a substantially vertically standing furnace shaft having an upper end and a lower end, wherein a conveying section extends between the two ends, wherein further at least one feeding means is provided which is adapted to charge at least the unexpanded mineral, material at one of the two ends of the furnace shaft into the furnace shaft in, the direction of the other of the two ends of the furnace shaft in order to expand the unexpanded mineral material, as seen in a conveying direction, in the last half of the conveying section, wherein at least one rotatable shaft insert is provided, which is arranged at least in sections in the furnace shaft and has at least one scraper blade, which forms with an inner wall of the furnace shaft at least one gap having a gap width and which is designed, during rotation of the at least one shaft insert in an operating state of the device, to remove caking on the inner wall in sections if a thickness of the caking is greater than the respective gap width, wherein the at least one shaft insert is rotatable about at least one axis of rotation which extends parallel to a longitudinal axis of the furnace shaft, wherein the conveying section leads through a plurality of heating zones which are arranged separately from one another in a conveying direction, wherein the heating zones each comprise at least one heating element which can be controlled independently of one another in order to heat the unexpanded mineral material at least to a critical temperature and to expand the sand grains, and wherein the at least one shaft insert each comprises a base body from which the at least one scraper blade projects with a directional portion parallel to a radial direction, wherein the radial direction lies in a plane normal to the axis of rotation of the respective shaft insert and, starting from the respective axis of rotation, faces away therefrom, wherein the respective base body, as viewed at least in the radial direction, is substantially closed.

2. The device according to claim 1, wherein the at least one shaft insert is rotatably mounted in the region of the upper end of the furnace shaft.

3. The device according to claim 1, wherein the at least one shaft insert has a plurality of scraper blades.

4. The device according to claim 3, wherein at least two of the scraper blades are arranged one behind the other as viewed in a circumferential direction around a radial center of the furnace shaft.

5. The device according to claim 3, wherein at least two of the scraper blades form gaps with the inner wall having different gap widths.

6. The device according to claim 1, wherein at least one drive means is provided for rotating the at least one shaft insert at a variable rotational speed.

7. The device according to claim 1, wherein the respective base body is essentially rotationally cylindrical.

8. The device according to claim 1, wherein the at least one scraper blade is arranged on the respective base body such that it can be extended/retracted and/or pivoted in order to be able to adjust the gap width.

9. The device according to claim 1, wherein the at least one scraper blade extends substantially in a straight line.

10. The device according to claim 1, wherein the at least one scraper blade extends at least in sections in a spiral or helical shape about an axis of rotation of the respective shaft insert.

11. The device according to claim 10, wherein, as viewed in a circumferential direction around a radial center of the furnace shaft, the gap width varies.

12. The device according to claim 1, wherein the gap width of the at least one gap varies as viewed in the conveying direction.

13. The device according to claim 1, wherein the inner wall is formed by at least one limiting element, and wherein the at least one shaft insert is made of the same material as the at least one limiting element.

14. The device according to claim 1, wherein the at least one axis of rotation coincides with the longitudinal axis.

15. The device according to claim 2, wherein the at least one shaft insert is floatingly mounted in the region of the lower end of the furnace shaft.

16. The device according to claim 3, wherein the at least one shaft insert has at most eight scraper blades.

17. The device according to claim 3, wherein the at least one shaft insert has two to four scraper blades.

18. The device according to claim 6, wherein the at least one drive means is adapted to set the rotational speed in the range from 0.125 rpm to 3 rpm.

19. The device according to claim 6, wherein the at least one drive means is adapted to set the rotational speed in the range from 0.5 rpm to 2 rpm.

20. The device according to claim 7, wherein, as seen in the conveying direction, upstream and/or downstream of the respective base body a shaft insert section tapering along the axis of rotation and away from the base body adjoins the respective base body.

21. The device according to claim 7, wherein, as seen in the conveying direction, upstream and/or downstream of the respective base body a shaft insert section tapering along the axis of rotation and away from the base body adjoins flush with the respective base body.

22. The device according to claim 9, wherein the at least one scraper blade extends parallel to the conveying direction.

23. The device according to claim 13, wherein the at least one limiting element is made of high-temperature steel.

* * * * *